(12) United States Patent
Koikawa et al.

(10) Patent No.: US 12,542,247 B2
(45) Date of Patent: Feb. 3, 2026

(54) ELECTRICAL DOUBLE LAYER CAPACITOR

(71) Applicant: Nippon Chemi-Con Corporation, Tokyo (JP)

(72) Inventors: Shun Koikawa, Osaka (JP); Satoshi Kubota, Tokyo (JP); Shuichi Ishimoto, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 407 days.

(21) Appl. No.: 18/023,097

(22) PCT Filed: Aug. 11, 2021

(86) PCT No.: PCT/JP2021/029667
§ 371 (c)(1),
(2) Date: Feb. 24, 2023

(87) PCT Pub. No.: WO2022/050013
PCT Pub. Date: Mar. 10, 2022

(65) Prior Publication Data
US 2023/0307192 A1    Sep. 28, 2023

(30) Foreign Application Priority Data

Sep. 4, 2020 (JP) .................. 2020-149277
Mar. 5, 2021 (JP) .................. 2021-035734

(51) Int. Cl.
*H01G 11/64* (2013.01)
*H01G 11/56* (2013.01)

(52) U.S. Cl.
CPC ............ *H01G 11/64* (2013.01); *H01G 11/56* (2013.01)

(58) Field of Classification Search
CPC ......... H01G 11/62; H01G 11/64; H01G 11/56
See application file for complete search history.

(56) References Cited

U.S. PATENT DOCUMENTS

| 2008/0138704 | A1 | 6/2008 | Mizuta et al. | |
| 2009/0092902 | A1* | 4/2009 | Abouimrane | H01M 10/052 |
| | | | | 429/306 |
| 2010/0069667 | A1 | 3/2010 | Hajime et al. | |

(Continued)

FOREIGN PATENT DOCUMENTS

| EP | 3614481 A1 | 2/2020 |
| JP | 2010-034071 A | 2/2010 |

(Continued)

OTHER PUBLICATIONS

International Search Report from International Patent Application No. PCT/JP2021/029667, Nov. 2, 2021.

(Continued)

*Primary Examiner* — David M Sinclair
(74) *Attorney, Agent, or Firm* — Potomac Law Group, PLLC

(57) ABSTRACT

The present disclosure provides an electric double layer capacitor with an electrolyte layer which suppresses leakage current and has high ion conductivity. The electric double layer capacitor includes a pair of electrode bodies and an electrolyte layer. The electrode bodies have polarizable electrodes. The electrolyte layer includes ionic liquid plastic crystals.

18 Claims, 3 Drawing Sheets

(56) References Cited

U.S. PATENT DOCUMENTS

2013/0295466 A1 11/2013 Kwon et al.
2018/0337426 A1* 11/2018 Matsumoto ............. C01B 33/18
2021/0111430 A1 4/2021 Ogawa et al.
2021/0336297 A1 10/2021 Suzuki

FOREIGN PATENT DOCUMENTS

| JP | 2014-504788 A | 2/2014 |
| JP | 5600613 B2 | 10/2014 |
| JP | 2015-156364 A | 8/2015 |
| JP | 2017-091813 A | 5/2017 |
| JP | 2020-068081 A | 4/2020 |
| WO | WO 2008/081811 A1 | 7/2008 |
| WO | WO 2020/067107 A1 | 4/2020 |

OTHER PUBLICATIONS

Office Action issued Jul. 1, 2025, in Chinese Patent Application No. 202180057960.X.

Extended European Search Report and European Search Opinion issued Apr. 23, 2024, in European Patent Application No. 21864071.2.

Office Action issued Feb. 3, 2025, in European Patent Application No. 21864071.2.

Office Action issued Apr. 22, 2025, in Japanese Patent Application No. 2022-546195.

* cited by examiner

ELECTRICAL DOUBLE LAYER CAPACITOR

FIELD OF INVENTION

The present disclosure relates to an electric double layer capacitor.

BACKGROUND

Electric double layer capacitors generally include a positive electrode body and a negative electrode body facing each other via an electrolyte layer. The positive and negative electrode bodies include polarizable electrodes such as activated carbon, and the electric double layer capacitor charges and discharges electricity by utilizing storage action of the electric double layer formed between the polarizable electrode and the electrolyte layer. The electric double layer capacitors are getting attention as a power storage source for their characteristics of long lifetime, high cycle property, high output density, and wide usable temperature, as they do not involve chemical reaction in charging and discharging.

Solid electrolyte layers may be selected as the electrolyte layer. A region of the solid electrolyte layer chemically reacting with the electrode, such as hydration degradation, is limited to the vicinity of the electrode. Therefore, leakage current is lower than that of electrolytic solution, and self-discharging is suppressed. Furthermore, an amount of generated gas due to the chemical reaction with the electrode is lower than that of electrolytic solution, and the risk of valve-opening and liquid leakage is also reduced.

The known solid electrolyte may be sulfide-based solid electrolytes such as $Li_2S \cdot P_2S_5$, oxide-based solid electrolytes such as $Li_7la_3Zr_2O_{12}$, plastic crystal-based solid electrolytes having N-ethyl-N-pyrrolidinium (P12) as cations and bis(fluorosulfonyl)amide (FSA) as cations, and polymer-based solid electrolyte such as polyethylene glycol. Note that a selected matrix phase of the electric double layer capacitor is doped with an electrolyte such as $TEMABF_4$.

The plastic crystal is soluble to organic solvents. Therefore, when the plastic crystal is employed as the solid electrolyte or the matrix phase of the solid electrolyte, a production method of dissolving anion components and cation components of the plastic crystal or salts thereof in the solvent and casting them onto the electrode can be employed. Accordingly, the plastic crystal-based solid electrolyte is advantageous in that adhesion to the electrode is improved and if active material phase of the electrode has a porous structure, it can easily enter into said structure, compared with other types of solid electrolytes.

PRIOR ART DOCUMENT

Patent Document

Patent Document 1: JP 2014-504788
Patent Document 2: JP 2017-91813

SUMMARY OF INVENTION

Problems to be Solved by Invention

However, it is noted that the ion conductivity of the plastic crystal-based solide electrolyte is two or three number of digits lower than the sulfide-based solid electrolyte and the oxide-based solid electrolyte. For example, it has been reported that the solid electrolyte containing the plastic crystal formed of N,N-diethylpyrrolidinium cations and bis(fluorosulfnoyl)amide anions had the ion conductivity of the order of magnitude of $1 \times 10^{-5}$ S/cm under 25 degrees environment. Furthermore, it has been reported that the solid electrolyte containing the plastic crystal formed of N,N-dimethylpyrrolidinium cations and bis(fluoromethane-sulfnoyl)amide anions had the ion conductivity of the order of magnitude of $1 \times 10^{-8}$ S/cm under 25 degrees environment.

In contrast, for example, it is reported that, when the solid electrolyte is $Li_2S \, P_2S_5$, the ion conductivity is the order of magnitude of $1 \times 10^{\times 2}$ S/cm. Also, for example, it is reported that, when the solid electrolyte is $Li_7la_3Zr_2O_{12}$, the ion conductivity is the order of magnitude of $1 \times 10^{-3}$ S/cm.

The present disclosure is proposed to solve the above problems, and an objective is to provide an electric double layer capacitor with an electrolyte layer which suppresses leakage current and has high ion conductivity.

Means to Solve the Problem

To address the above-described problem, an electric double layer capacitor of the present disclosure includes:
 a pair of electrode bodies having polarizable electrodes; and
 an electrolyte layer including ionic liquid and plastic crystals. The ion conductivity of the electrolyte layer, in which leakage current is suppressed due to the presence of the plastic crystal, is improved when used together with the ionic liquid with relatively high ion conductivity.

The plastic crystal and the ionic liquid may have the same type of anion components. By adding the ionic liquid with ion conductivity higher than that of the plastic crystal to the electrolyte layer, the electrolyte layer with high ion conductivity can be obtained. On the other hand, if the addition amount of the ionic liquid is increased, leakage current will increase. The inventors have well studied, and found that the ion conductivity of the electrolyte layer is improved when the anion component forming the ionic liquid and the anion component forming the plastic crystal are the same. Therefore, high ion conductivity can be achieved even if the addition amount of the ionic liquid is limited, and leakage current can be suppressed because the addition amount of the ionic liquid is limited.

The plastic crystal may be included in the electrolyte layer at a ratio of 60 mol % to 90 mol % relative to the total of the ionic liquid and the plastic crystal. The ion conductivity of the electrolyte layer improves when said ratio is 90 mol % or less.

Furthermore, the plastic crystal may be included in the electrolyte layer at a ratio of 60 mol % to 80 mol % relative to the total of the ionic liquid and the plastic crystal. By forming the plastic crystal and the ionic liquid by the same anion component, the ratio of the plastic crystal may be 60 mol % to 80 mol %, while achieving the high ion conductivity. In addition, when the ratio of the plastic crystal is 60 mol % to 80 mol %, leakage current of the electrolyte layer can be suppressed, further improving the ion conductivity.

The electrolyte layer may include other types of plastic crystals.

The electrolyte layer may further include other types of plastic crystals having anion components different from that of the ionic liquid, in addition to the plastic crystal having the anion component as same as that of the ionic liquid. On the premise that the electrolyte layer includes the plastic crystal having the anion component as same as that of the ionic liquid, when the electrolyte layer includes other types of plastic crystal having the anion component different from that of the ionic liquid, the effect of low ion conductivity of the plastic crystal to the electrolyte layer becomes smaller, and the ion conductivity of the electrolyte layer becomes further close to the ion conductivity of the ionic liquid.

The other types of the plastic crystal may cation components other that of the plastic crystal having the anion components as same as that of the ionic liquid.

The molar ratio of the plastic crystal having the anion component as same as that of the ionic liquid and the other types of the plastic crystal having the anion component different from that of the ionic liquid may be in a range of 40:60 to 60:40.

As the plastic crystal having the anion components as same as that of the ionic liquid, the electrolyte layer may include two types of plastic crystals having different cation components from each other. When two types of the plastic crystals are included in the electrolyte layer, the effect of low ion conductivity of the plastic crystal to the electrolyte layer becomes smaller, and the ion conductivity of the electrolyte layer becomes further close to the ion conductivity of the ionic liquid.

The plastic crystal included in the electrolyte layer may be included in the electrolyte layer having pyrrolidinium cations, ammonium cations, piperidinium cations, and phosphonium cations. For example, the plastic crystal may have spiro-type pyrrolidinium cations, N-ethyl-N-pyrrolidinium cations, triethylmethylammonium cations, or phosphonium cations. Although not limited thereto, when the electrolyte layer includes the plastic crystal having pyrrolidinium cations, ammonium cations, piperidinium cations, or phosphonium cations, the effect of low ion conductivity of the plastic crystal to the electrolyte layer becomes smaller, and the ion conductivity of the electrolyte layer becomes further close to the ion conductivity of the ionic liquid.

Furthermore, the cation of the plastic crystal included in the electrolyte layer may not include lithium ions. For example, the cation of the plastic crystal included in the electrolyte layer may be selected only from spiro-type pyrrolidinium cations N-ethyl-N-pyrrolidinium cations, triethylmethylammonium cations, or phosphonium cations.

The electrolyte layer may further include carbonate polymers. By this, the ion conductivity of the electrolyte layer is further improved.

Effect of Invention

According to the present disclosure, the electrolyte layer of the electric double layer capacitor achieves both high ion conductivity and suppressed leakage current.

EMBODIMENTS

Figure 1:
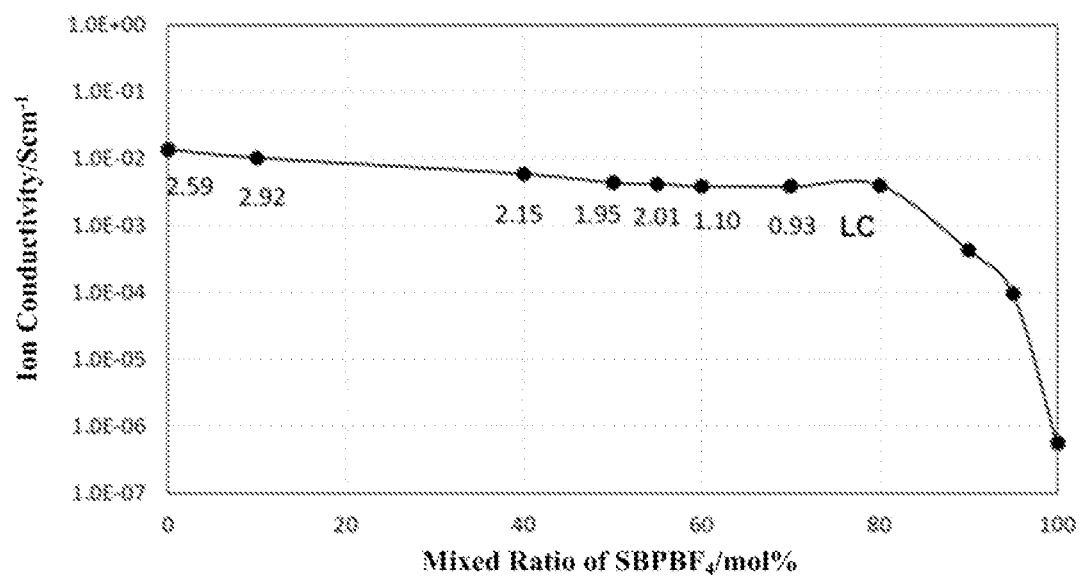
FIG. 1 is a graph showing a measurement result of the ion conductivity and the leakage current of the electrolyte of the example 10.

Hereinafter, the embodiment of the present disclosure will be described. Note that the present disclosure is not limited to the following examples.

Overall Configuration

An electric double layer capacitor of the present embodiment includes positive and negative electrode bodies having polarizable electrodes facing each other via a separator. An electrolyte layer is filled between the positive and negative electrode bodies. The electric double layer capacitor charges and discharges electricity by utilizing storage action of the electric double layer formed at an interface between the polarizable electrode and the electrolyte layer. For example, the electric double layer capacitor is a wound-type, has the strip electrode body, and is formed by overlaying the electrode body at the positive electrode side and the electrode body at the negative electrode side via the separator and spirally winding them.

When the electric double layer capacitor is charged, pores at the polarizable electrode side and anions of the electrolyte layer forms a pair via extremely short distance at the interface between the polarizable electrode at the positive electrode side and the electrolyte layer. By this, a potential barrier at the positive electrode. Furthermore, when the electric double layer capacitor is charged, pores at the polarizable electrode side and cations of the electrolyte layer forms a pair via extremely short distance at the interface between the polarizable electrode at the negative electrode side and the electrolyte layer. By this, a potential barrier at the negative electrode. The electrolyte layer supplies these anions and cations.

Electrolyte Layer

The electrolyte layer is produced by adding ionic liquid and plastic crystals. The ionic liquid is salts present in a liquid state in the temperature range including room temperature and is liquid only formed of ions. The ionic liquid has relatively high ion conductivity and is nonflammable or flame retardant. The plastic crystal is also referred to as plastic crystal and has ordered orientation and disordered orientation. That is, the plastic crystal has a three-dimensional crystal lattice in which anions and cations are regularly arranged, while the anions and cations have rotational irregularity.

Due to the ordered orientation thereof, the plastic crystal has poor flowability, and a region chemically reacting the electrode is limited to the vicinity of the electrode, suppressing the leakage current of the electrolyte layer. Therefore, the ion conductivity of the electrolyte layer, in which leakage current is suppressed due to the presence of the plastic crystal, becomes excellent by including the ionic liquid with relatively high ion conductivity. However, this electrolyte layer does not flow, and the entire system is solid in visual.

Although the types of the anion component and cation component forming the plastic crystal are not limited, it is preferable that the type of the anion component is the same as that of the ionic liquid. When the electrolyte layer is produced by adding the ionic liquid and the plastic crystal both having the same anion component, the ion conductivity of the electrolyte layer would not be extremely reduced when compared with the ion conductivity of the ionic liquid, even if the ratio of the plastic crystal relative to the electrolyte layer is high.

Therefore, both high ion conductivity and suppressed leakage current can be achieved even when the ratio of the plastic crystal is high.

When the ionic liquid and the plastic crystal have the same anion component, it is preferable that the molar concentration of the plastic crystal in the electrolyte layer is 60 mol % to 80 mol % relative to the total of the ionic liquid and the plastic crystal. When the ratio of the plastic crystal is 60 mol % or more, the leakage current of the electrolyte layer can be suppressed small. When the plastic crystal includes the anion component as same as that of the ionic liquid, the ratio of the plastic crystal can be made to be 60 mol % or more without largely reducing the ion conductivity, so that both high ion conductivity and suppressed leakage current can be achieved. In contrast, when the ratio of the plastic crystal having the anion component as same as that of the ionic liquid exceeds 80 mol %, the effect of low ion conductivity of the plastic crystal to the electrolyte layer rapidly increases, and the ion conductivity of the electrolyte layer rapidly decreases.

Note that, if the molar concentration of the plastic crystal in the electrolyte layer is 60 mol % to 90 mol % relative to the total of the ionic liquid and the plastic crystal, the ion conductivity of the electrolyte layer can be increased compared with the case in which the electrolyte layer is formed of only the plastic crystal whether the anion component included in the ionic liquid and the plastic crystal is same or different, The anion component of the same type of the ionic liquid and the plastic crystal have is not limited if said anion component may form the ionic liquid and the plastic crystal, and is elected from the group consisting of $BF_4$ anions, TFSA anions, FSA anions, and $BF_3CF_3$ anions.

$BF_4$ anion is tetrafluoroborate anion expressed by the following formula (1).

[Formula 1]

(1)

$TFSA_4$ anion is bis(trifluoromethanesulfonyl)amide anion expressed by the following formula (2).

[Formula 2]

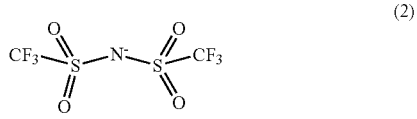

(2)

FSA anion is bis(fluorosulfonyl) anion expressed by the following formula (3).

[Formula 3]

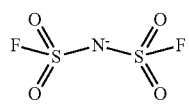

(3)

$BF_3CF_3$ anion is mono(fluoroalkyl)trifluoro borate anion expressed by the following formula (4).

[Formula 4]

(4)

The electrolyte layer may include two or more types of plastic crystal, however, on the premise that the electrolyte layer includes the plastic crystal having the anion component as same as that of the ionic liquid (hereinafter referred to as the anion homogeneous plastic crystal), it is preferable that the plastic crystal formed by the anion component (hereinafter referred to as the anion heterogeneous plastic crystal) different from that of the ionic liquid is further included. For example, when the anion component of the ionic liquid is $BF_4$ anion, the plastic crystal formed by $BF_4$ anion and the plastic crystal formed by TFSA anion may be included in the electrolyte layer.

When the anion heterogeneous plastic crystal is further included in the electrolyte layer on the premise that the electrolyte layer includes the anion homogeneous plastic crystal, the effect of low ion conductivity of the plastic crystal to the electrolyte layer becomes smaller, and the ion conductivity of the electrolyte layer becomes further close to the ion conductivity of the ionic liquid. The addition ratio of the anion homogeneous plastic crystal and the anion heterogeneous plastic crystal is not particularly limited, and for example, the anion homogeneous plastic crystal and the anion heterogeneous plastic crystal are included in the electrolyte in equimolar amount.

Note that, if the plastic crystal is formed by the anion component different from that of the ionic liquid, the anion component may be PF6 anions, tris(pentafluoroethyl)trifluorophosphate anions (FAP anions), N,N-hexafluoro-1,3-disulfonylamide anions (CFSA anions), bis(pentafluoroethylsulfonyl)amide anions (BETA anions), and various perfluoroalkylsulfonic acid anions.

Various perfluoroalkylsulfonic acid anion is expressed by the following formula (5). In detail, various perfluoroalkylsulfonic acid anions may be trifluoromethanesulfonic acid anions in which r is 1 in the formula (5), pentafluoroethanesulfonic acid anions in which r is 2 in the formula (5), heptafluoropropanesulfonic acid anions in which r is 3 in the formula (5), and NFS anions, that is, nonafluorobutanesulfonic acid anions in which r is 4 in the formula (5). Various perfluoroalkylsulfonic acid anion is cited.

[Formula 5]

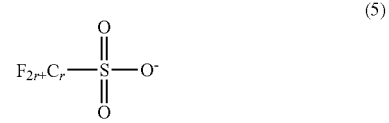

(5)

In the formula (5), r is an integer of 1 or more, and carbon number is arbitrary.

The cation component of the ionic acid is not particularly limited if the cation component may form the ionic acid, and for example, may be EMI cations, BMI cations, MPI cations, DEME cations, MEMP cations, P13 cations, pyridinium cations, pyperidinium cations, and phosphonium cations.

EMI cation is 1-ethyl-3-methylimidazolium cation expressed by the following formula (6).

[Formula 6]

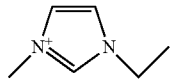
(6)

BMI cation is 1-butyl-3-methylimidazolium cation expressed by the following formula (7).

[Formula 7]

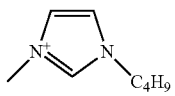
(7)

In the formula (7), a butyl group is a n-butyl group.

MPI cation is 1-methyl-3-propylimidazolium cation expressed by the following formula (8).

[Formula 8]

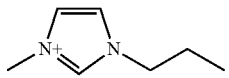
(8)

DEME cation is N,N-diethyl-N-methyl-(2-methoxyethyl) ammonium cation expressed by the following formula (9).

[Formula 9]

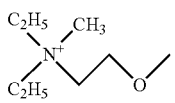
(9)

MEMP cation is N—(2-methoxyethyl)-N-methylpyrrolidinium cation expressed by the following formula (10).

[Formula 10]

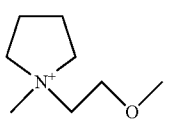
(10)

P13 cation is N-propyl-N-methylpyrrolidinium cation expressed by the following formula (11).

[Formula 11]

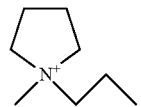
(11)

Note that the cation is not limited to MEMP cation and P13 cation if the cation has pyrrolidinium skeleton. For example, the cation having the pyrrolidinium skeleton may be 1-ethyl-1-methylpyrrolidinium cations, 1-propyl-1-methylpyrrolidinium cations, 1-butyl-1-methylpyrrolidinium cations, 1-ethyl-1-ethylpyrrolidinium cations, 1-propyl-1-ethylpyrrolidinium cations, or 1-butyl-1-ethylpyrrolidinium cations.

Pyridinium cation may be pyridinium cations in which position 2 is replaced by methyl group expressed in the following formula (12), pyridinium cations in which position 3 is replaced by methyl group expressed in the following formula (13) and pyridinium cations in which position 4 is replaced by methyl group expressed in the following formula (14).

[Formula 12]

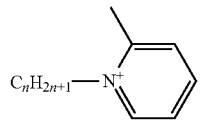
(12)

In the formula (12), n is an integer of 1 or more, and carbon number is arbitrary.

For example, pyridinium cation in which position 2 is replaced by methyl group expressed in the following formula (12) may be 1-ethyl-2-methylpyridinium cations, 1-propyl-2-methylpyridinium cations, and 1-butyl-2-methylpyridinium cations.

[Formula 13]

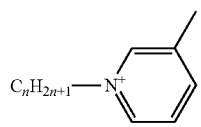
(13)

In the formula (13), n is an integer of 1 or more, and carbon number is arbitrary.

For example, pyridinium cation in which position 3 is replaced by methyl group expressed in the following formula (13) may be 1-ethyl-3-methylpyridinium cations, 1-propyl-3-methylpyridinium cations, and 1-butyl-3-methylpyridinium cations.

[Formula 14]

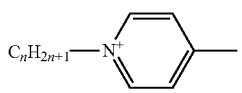
(14)

In the formula (14), n is an integer of 1 or more, and carbon number is arbitrary.

For example, pyridinium cation in which position 4 is replaced by methyl group expressed in the following formula (14) may be 1-ethyl-4-methylpyridinium cations, 1-propyl-4-methylpyridinium cations, and 1-butyl-4-methylpyridinium cations.

Piperidinium cation may be 1-alkyl-1-methylpiperidinium cations or 1-alkyl-1-ethylpiperidinium cations expressed by the following formula (15), or 1-methoxyethyl-1-methylpiperidinium cations expressed by the following formula (16).

[Formula 15]

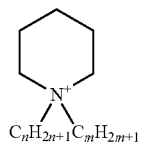

(15)

In the formula (15), n is an integer of 1 or more, carbon number is arbitrary, and m is an integer of 1 or 2.

For example, 1-alkyl-1-methylpiperidinium cation expressed in the following formula (15) may be 1-ethyl-1-methylpiperidinium cations, 1-propyl-1-methylpiperidinium cations, and 1-butyl-1-methylpiperidinium cations. Furthermore, 1-alkyl-1-ethylpiperidinium cation expressed in the following formula (15) may be 1-ethyl-1-ethylpiperidinium cations, 1-propyl-1-ethylpiperidinium cations, and 1-butyl-1-ethylpiperidinium cations.

[Formula 16]

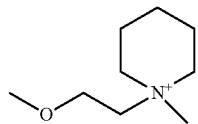

(16)

Phosphonium is tetraalkylphosphonium cations replaced by linear alkyl group with any carbon number as expressed in the following formula (17). For example, tetraalkylphosphonium cation may be tetraethylphosphonium cations (TEP cations).

[Formula 17]

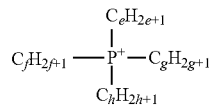

(17)

In the formula (17), e, f, g, and h are an integer of 1 or more, and carbon number is arbitrary.

The cation component of the plastic crystal is not limited if the cation component can form the plastic crystal, and in particular, pyrrolidinium cations, ammonium cations, piperidinium cations expressed in the formula (15), and phosphonium cations expressed in the formula (17) are preferable. When the electrolyte layer is produced by the plastic crystal formed by the anion component as same as that of the ionic liquid and these cation component, adding the ionic liquid and the plastic crystal both having the same anion component, in particular, the effect of low ion conductivity of the plastic crystal to the electrolyte layer becomes smaller, and the ion conductivity of the electrolyte layer becomes further close to the ion conductivity of the ionic liquid.

Pyrrolidinium cation is cations having pyrrolidinium skeleton, and includes SBP cations, P12 cations, P11 cations, P13 iso-cations, and P22 cations, etc. Among these pyrrolidinium cations, SBP cation and P12 cations are particularly preferable from the viewpoint of ion conductivity improvement. SBP cation is spiro-type pyrrolidinium expressed by the following formula (18).

[Formula 18]

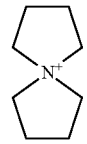

(18)

P12 cation is N-ethyl-N-methylpyrrolidinium cations expressed by the following formula (19).

[Formula 19]

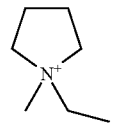

(19)

P11 cation is 1-methyl-1-methylpyrrolidinium cations expressed by the following formula (20).

[Formula 20]

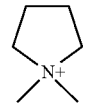

(20)

P13 iso-cation is 1-isopropyl-1-methylpyrrolidinium cations expressed by the following formula (21).

[Formula 21]

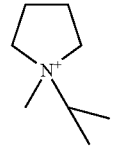

(21)

P22 cation is 1-ethyl-1-ethylpyrrolidinium cations expressed by the following formula (22).

[Formula 22]

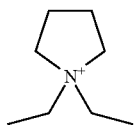

(22)

Tetraalkylammonium that is the ammonium cation is quaternary ammonium replaced by linear alkyl group with any carbon number as expressed in the following formula (23).

[Formula 23]

$$C_bH_{2b+1}-\underset{\underset{C_dH_{2d+1}}{|}}{\overset{\overset{C_aH_{2a+1}}{|}}{N^+}}-C_cH_{2c+1} \quad (23)$$

In the formula (23), a, b, c, and d are an integer of 1 or more, and carbon number is arbitrary.

For example, ammonium cation includes triethylmethylammonium cations (TEMA cations) expressed in the following formula (24), and this TEMA cation is particularly preferable among ammonium cations from the viewpoint of ion conductivity improvement.

[Formula 24]

$$C_2H_5-\underset{\underset{C_2H_5}{|}}{\overset{\overset{C_2H_5}{|}}{N^+}}-CH_3 \quad (24)$$

Furthermore, ammonium cation includes triethylammonium cations (TEA cations) expressed in the following formula (25).

[Formula 25]

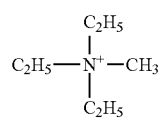

(25)

Piperidinium cation used in the plastic crystal includes 1-methyl-1-methylpiperidinium cations expressed by the following formula (26).

[Formula 26]

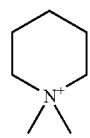

(26)

Piperidinium cation used in the plastic crystal includes 1-isopropyl-1-methylpiperidinium cations expressed by the following formula (27).

[Formula 27]

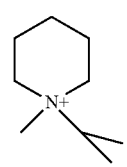

(27)

Furthermore, piperidinium cation used in the plastic crystal includes 1-methyl-1-ethylpiperidinium cations expressed by the following formula (28).

[Formula 28]

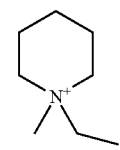

(28)

In addition, piperidinium cation used in the plastic crystal includes 1-ethyl-1-ethylpiperidinium cations expressed by the following formula (29).

[Formula 29]

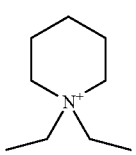

(29)

As the anion homogeneous plastic crystal, it is preferable to include two types of cations different from each other in the electrolyte layer. When two types of the anion homogeneous plastic crystals different from each other are included in the electrolyte layer, the effect of low ion conductivity of the plastic crystal to the electrolyte layer becomes smaller, and the ion conductivity of the electrolyte layer becomes further close to the ion conductivity of the ionic liquid.

It is preferable that the cation component of the anion heterogeneous plastic crystal and the cation component of the anion homogeneous plastic crystal are also different from each other. In this case, if at least the molar concentration of 30 mol % or more of the anion homogeneous plastic crystal is included relative to the total of the anion homogeneous plastic crystal and the anion heterogeneous plastic crystal, the ion conductivity of the electrolyte layer is improved compared with the case in which the plastic crystal in the electrolyte layer is only the anion homogeneous plastic crystal.

Furthermore, when the molar ratio of the anion homogeneous plastic crystal and the anion heterogeneous plastic crystal is 40:60 to 60:40, the ion conductivity of the electrolyte layer is further improved, and in particular, when the amount of the anion homogeneous plastic crystal and the anion heterogeneous plastic crystal is equivalent, the ion conductivity of the electrolyte layer becomes quite close to the ion conductivity of the ionic liquid.

The electrolyte layer may be produced by further adding polymers. The polymer may be polyethylene oxide (PEO), polypropylene oxide, polyester, or carbonate polymers. Carbonate polymer may be polyethylene carbonate (PEC), PEC derivatives, polypropylene carbonate, polytrimethylene carbonate, or copolymers of polytrimethylene carbonate and polycarbonate. The polymer may be used in single or in combination of two or more. Among these polymers, carbonate polymer is only an example, and any aliphatic polycarbonate may be used. Furthermore, when using the combination of two or more polymers, each polymer may be homopolymers or copolymers of two or more monomers. Although the molecular weight of the polymer is not limited, it is preferable that the molecular weight of the polymer is 1 million or more, and it is preferable that the molecular weight of the polyethylene oxide (PEO) is 1 million or more.

By adding the polymer, the mechanical strength of the electrolyte layer can be improved. It is preferable that the addition amount of the polymer is 15 wt % or less relative to the entire electrolyte layer. However, when adding carbonate polymer to the electrolyte layer, the addition amount of carbonate polymer may be in the range of 10 wt % to 150 wt % relative to the total amount of the plastic crystal forming the electrolyte layer, may preferably be in the range of 20 wt % to 100 wt %, and may further preferably be in the range around 50 wt %. When the carbonate polymer is included in the range of 20 wt % to 100 wt %, the ion conductivity is improved, and when the carbonate polymer is included in the range around 50 wt %, the ion conductivity of the electrolyte layer is further improved.

An example production method of such an electrolyte layer including the plastic crystal and the ionic liquid is as follows. Note that the production method of the solid electrolyte including the plastic crystal is not limited to the below, and various method may be used.

For the plastic crystal and the ionic liquid, alkali metal salt that is the anion component forming the plastic crystal and the ionic liquid, and the halogenated cation component are each dissolved in solvent. The alkali metal may be Na, K, Li, and Cs. Halogens may be F, Cl Br, and I. Water is preferable as the solvent. Solution of anion metal salt is added drop by drop to the halogenated cation solution, to cause ion exchange reaction. The solution of anion metal salt is added in equimolar amount to the halogenated cation solution, and the mixture is stirred.

At this time, halogenated alkali metal is produced together with the plastic crystal and the ionic liquid due to ion exchange. When organic solvent such as dichloromethane is added to the mixture and the mixture is placed still, layers of the mixture is separated into a water layer and an organic solvent layer. The halogenated alkali metal is removed by removing the water layer from the separated mixture. This action may be repeated multiple times, such as five times. Accordingly, after removing the halogenated alkali meta, the organic solvent such as dichloromethane is evaporated to obtain the plastic crystal and the ionic liquid.

The plastic crystal and the ionic liquid are added to a vial. To include two types of the plastic crystals in the electrolyte layer, each plastic crystal is respectively purified and is added to the vial in the molar ratio of 1:1. To add the polymer, the polymer is added to the vial at this timing. The organic solvent is further added to the vial. The organic solvent is a solvent in which the plastic crystal and the electrolyte are soluble and the ionic liquid would not be separated into phases and is, for example, acetonitrile.

Then, the solution in the vial is casted on a target such as the active material layer of the electrode to be attached on the electrolyte layer, the separator, or the both. After the casting, the solution is left under the temperature environment in which the organic solvent volatilize, such as 80 degrees, to volatilize the solvent by drying, and the remaining moisture is further volatilized in the temperature environment, such as 150 degrees. By this, the electrolyte layer is formed on the target.

Note that the plastic crystal may be doped with ionic salts that will be the electrolyte. The ionic salt may be organic acid salt, inorganic acid salt, or salt of composite compound of organic acid and inorganic acid, and may be used in single or in combination of two or more.

Organic acid may be oxalic acid, succinic acid, glutaric acid, pimelic acid, suberic acid, sebacic acid, phthalic acid, isophthalic acid, terephthalic acid, maleic acid, adipic acid, benzoic acid, and toluyl acid, enanthic acids, malonic acids, carboxylic acids such as 1,6-decandicarboxylic acid, 1,7-octanedicarboxylic acid, azelaic acid, undecanedioic acid, dodecanedioic acid, tridecanedioic acid, phenols and sulfonic acids Furthermore, the inorganic acid may be boric acid such as tetrafluoroborate, phosphoric acid, phosphorus acid, hypophosphorous acid, carbonic acid, and silicic acid, etc. The composite compound of organic acid and inorganic acid may be borodisalicylic acid, borodioxalic acid, and borodiglycolic acid.

At least one salt of the organic acid, the inorganic acid, and the composite compound of organic acid and inorganic acid may be ammonium salt, quaternary ammonium salt, quaternary amidinium salt, amine salt, sodium salt, and potassium salt, etc. Examples of the quaternary ammonium ion of the quaternary ammonium salts include tetramethylammonium, triethylmethylammonium, tetraethylammonium, and the like. The quaternary amidinium salt may be ethyldimethylimidazolinium and tetramethylimidazolinium, etc. Amines in the amine salt may be primary amines, secondary amines, and tertiary amines. The primary amine may be methylamine, ethylamine, propylamine, and the like, examples of the secondary amines include dimethylamine, diethylamine, ethylmethylamine and dibutylamine, and the like, and examples of the tertiary amines include trimethylamine, triethylamine, tributylamine, ethyldimethylamine, and ethyldiisopropylamine, etc.

Electrode Body

Positive and negative electrodes are formed by forming polarizable electrodes on a current collector. Metal having valve action, such as aluminum foil, platinum, gold, nickel, titanium, steel, and carbon may be used for the current collector. A shape of the current collector may be any shape such as a film-shape, a foil-shape, a plate-shape, a net-shape, an expand-metal-shape, and a cylinder-shape, etc. Furthermore, a surface of the current collector may be an uneven surface such as by etching, or may be plain surface. Furthermore, surface treatment may be performed to adhere phosphorus on the surface of the current collector.

Porous carbon material with electric double layer capacity is preferable for the polarizable electrode. The porous carbon material is particularly suitable for this electrolyte layer. Since the plastic crystal is soluble, the plastic crystal easily enters into the porous structure, increasing the filling rate into the polarizable electrode. In contrast, the filling rate of solid electrolytes of sulfide and oxide into the porous structure is low. Therefore, the electric double layer capacitor employing this plastic crystal achieves both excellent filling rate into the porous structure and high ion conductivity, resulting in high capacity and high output. Note that, the active material layer including metal compound particles and carbon material producing Faraday reaction may be form on either of the positive electrode or negative electrode.

The carbon material in the polarizable electrode is mixed with a conductive aid and a binder and is applied on the current collector by doctor blading, etc. The mixture of the carbon material, the conductive aid, and the binder may be formed into a sheet and may be pressure-bonded on the current collector. Here, the porous structure is formed by gaps produced between primary particles and secondary particles if the carbon material has particle-shape, and is formed by gaps produced between fiber if the carbon material is fiber.

The carbon material in the polarizable electrode may be natural plant tissue such as coconut shell, synthetic resin such as phenol, activated carbon made from fossil fuel such as coal, coke, pitch, carbon black such as Ketjen black, acetylene black, and channel black, carbon nanohorn, amorphous carbon, natural graphite, artificial graphite, graphitized Ketjen black, mesoporous carbon, carbon nanotube, and carbon nanofiber. Activation treatment, such as steam activation, alkali activation, zinc chloride activation, or electric field activation, and apeture processing may be performed to the carbon material to improve the specific surface are thereof.

For example, the binder may be rubber such as fluorine-based rubber, diene-based rubber, and styrene-based rubber, fluorine-containing polymers such as polytetrafluoroethylene and polyvinylidene difluoride, cellulose such as carboxymethyl cellulose and nitrocellulose, and others such as polyolefin resin, polyimide resin, acryl resin, nitrile resin, polyester resin, phenol resin, polyvinyl acetate resin, polyvinyl alcohol resin, and epoxy resin. These binders may be used in single or in combination of two or more.

The conductive agent may be Ketjen black, acetylene black, natural/artificial graphite, and fibrous carbon, and the fibrous carbon may be carbon nanotube and carbon nanofiber (hereinafter referred to as CNF), etc. The carbon nanotube may be single-walled carbon nanotube (SWCNT) with a single layer of a graphene sheet, multi-walled carbon nanotube (MWCNT) in which two or more layers of graphene sheets are curled up on a same axis and a tube wall forms multiple layers, or mixture thereof.

A carbon coating layer including the conductive aid such as graphite may be provided between the current collector and the active material layer. By applying a slurry including the conductive aid such as graphite and the binder on the surface of the current collector and drying the slurry, the carbon coating layer can be formed.

Separator

The separator is provided to prevent the positive and negative electrode bodies from contacting each other and to maintain the state of the electrolyte layer. Therefore, if the electrolyte layer has the thickness sufficient to prevent the positive and negative electrode bodies from contacting each other, or has the rigidity that enables to maintain its state by itself, the electric double layer capacitor may be so-called separator-less.

When using the separator in the electric double layer capacitor, the separator may be cellulose such as kraft, Manila hemp, esparto, hemp, and rayon, and mixed papers thereof, polyester resin such as polyethylene terephthalate, polybutylene terephthalate, polyethylene naphthalate, and derivatives thereof, polytetrafluoroethylene resin, polyvinylidene fluoride resin, vinylon resin, polyamide resin such as aliphatic polyamide, semi-aromatic polyamide, and total aromatic polyamide, polyimide resin, polyethylene resin, polypropylene resin, trimethylpentene resin, polyphenylene sulfide resin, and acrylic resin, and the like, and these resins may be used alone or in combination.

Examples 1 to 3

Electrolyte layers for the electric double layer capacitors of the examples 1 to 3 were produced, and the ion conductivity of the electrolyte layers of respective examples were measured.

The electrolyte layer of the example 1 was produced by using the plastic crystal including SBP cations and CFSA cations in a molar ratio of 1:1. Furthermore, the electrolyte layer of the example 1 was produced by using the ionic liquid including EMI cations and $BF_4$ cations in a molar ratio of 1:1 (from Tokyo Chemical Industry Co. Ltd.). The plastic crystal (A) and the ionic liquid (B) were added to a vial in a molar ratio of A:B=77:23.

Furthermore, acetonitrile (from FUJIFILM Wako Pure Chemical Corporation) was added so that the total amount of the plastic crystal and the ionic liquid became 10 wt %. This acetonitrile solution was dropped on a glass separator and was dried under 80 degrees to evaporate acetonitrile. This evaporation operation was repeated three times. In this evaporation operation, the glass separator on which the electrolyte layer was formed was dried at 80 degrees for 12 hours under vacuum environment, was further dried at 120 degrees for 3 hours under vacuum environment, and was dried at 150 degrees for 2 hours under vacuum environment, so that the moisture was removed and the electrolyte layer of the example 1 was obtained. However, this electrolyte layer does not flow and the entire system is solid in visual.

The electrolyte layer of the example 2 was produced by using the plastic crystal including SBP cations and NFS anions in a molar ratio of 1:1. Furthermore, the electrolyte layer of the example 2 was produced by using the ionic liquid including EMI cations and $BF_4$ anions in a molar ratio of 1:1 (from Tokyo Chemical Industry Co. Ltd.). The plastic crystal (A) and the ionic liquid (B) were added to a vial in a molar ratio of A:B=77:23. The process of adding and drying the organic solvent to obtain the electrolyte layer after the plastic crystal and the ionic liquid were added in the vial was the same as the example 1 for all method and condition.

The electrolyte layer of the example 3 was produced by using the plastic crystal including P12 cations and $BF_3CF_3$ anions in a molar ratio of 1:1. Furthermore, the electrolyte layer of the example 2 was produced by using the ionic liquid including EMI cations and $BF_4$ anions in a molar ratio of 1:1 (from Tokyo Chemical Industry Co. Ltd.). The plastic crystal (A) and the ionic liquid (B) were added to a vial in a molar ratio of A:B=77:23. The process of adding and drying the organic solvent to obtain the electrolyte layer after the plastic crystal and the ionic liquid were added in the vial was the same as the example 1 for all method and condition.

The ion conductivity of the electrolyte layers of the electric double layer capacitors of the examples 1 to 3 were measured. That is, the glass separator on which the electrolyte layers of the examples 1 to 3 were formed was sandwiched by two platinum electrodes and was held to face each other by an electrode holder, a two-pole sealed cell (Toyo System) is assembled, the impedance is measured, and the ion conductivity was calculated from the measurement result of the impedance and the thickness of the glass separator in which the electrode layer was impregnated. The measurement results for the ion conductivity are shown in Table 1.

TABLE 1

| | Plastic Crystal | | Ionic Liquid | | Ratin of Plastic | Ion |
|---|---|---|---|---|---|---|
| | Types | Ion Conductivity (S/cm) | Types | Ion Conductivity (S/cm) | Crystal (mol %) | Conductivity (S/cm) |
| Example 1 | SBPCFSA | $2.3 \times 10^{-7}$ | $EMIBF_4$ | $1.4 \times 10^{-2}$ | 77 | $1.0 \times 10^{-3}$ |
| Example 2 | SBPNFS | $4.0 \times 10^{-8}$ | $EMIBF_4$ | $1.4 \times 10^{-2}$ | 77 | $6.1 \times 10^{-5}$ |
| Example 3 | $P12BF_3CF_3$ | $2.1 \times 10^{-5}$ | $EMIBF_4$ | $1.4 \times 10^{-2}$ | 77 | $1.1 \times 10^{-3}$ |

Note that, in the table 1, the ion conductivity of the electrolyte layer in which only the plastic crystal included each examples were used and the ionic liquid was not used is described. A comparative electrolyte layer was produced with the same condition as the electrolyte layers of each examples except that said electrolyte layer was formed of only the plastic crystal. Furthermore, the ion conductivity of the electrolyte layer in which only the ionic liquid is included each examples were used and the plastic crystal was not used is described. The comparative electrolyte layer was produced with the same condition as the electrolyte layers of each examples except that said electrolyte layer was formed of only the ionic liquid.

As shown in the table 1, the ion conductivity of the electrolyte layer for the electric double layer capacitor of the example 1 was 5000 times higher than the ion conductivity of the electrolyte layer formed of only the plastic crystal. The ion conductivity of the electrolyte layer for the electric double layer capacitor of the example 2 was 1500 times higher than the ion conductivity of the electrolyte layer formed of only the plastic crystal. The ion conductivity of the electrolyte layer for the electric double layer capacitor of the example 3 was 50 times higher than the ion conductivity of the electrolyte layer formed of only the plastic crystal.

Accordingly, it was found that the ion conductivity of the electrolyte layer for the electric double layer capacitor including the plastic crystal and the ionic liquid was improved compared with the ion conductivity of the electrolyte layer formed of only the plastic crystal. Therefore, the electrolyte layer for the electric double layer capacitor including the plastic crystal and the ionic liquid can address the low ion conductivity of the plastic crystal and have high ion conductivity, while preventing the leakage current by the plastic crystal.

Examples 4 to 9

Electrolyte layers for the electric double layer capacitors of the examples 4 to 9 were produced, and the ion conductivity of the electrolyte layers of respective examples were measured. The electrolyte layers of the examples 4 to 9 were different from the examples 1 to 3 in that the ionic liquid and the plastic crystal had the same type of anion components.

The electrolyte layer of the example 4 was produced by using the plastic crystal including SBP cations and $BF_4$ anions in a molar ratio of 1:1. Furthermore, the electrolyte layer of the example 4 was produced by using the ionic liquid including EMI cations and $BF_4$ anions in a molar ratio of 1:1 (from Tokyo Chemical Industry Co. Ltd.). The plastic crystal (A) and the ionic liquid (B) were added to a vial in a molar ratio of A:B=80:20. The process of adding and drying the organic solvent to obtain the electrolyte layer after the plastic crystal and the ionic liquid were added in the vial was the same as the example 1 for all method and condition.

The electrolyte layer of the example 5 was produced by using the plastic crystal including P12 cations and $BF_3CF_3$ anions in a molar ratio of 1:1. Furthermore, the electrolyte layer of the example 5 was produced by using the ionic liquid including EMI cations and $BF_3$ anions in a molar ratio of 1:1 (from Tokyo Chemical Industry Co. Ltd.). The plastic crystal (A) and the ionic liquid (B) were added to a vial in a molar ratio of A:B=77:23. The process of adding and drying the organic solvent to obtain the electrolyte layer after the plastic crystal and the ionic liquid were added in the vial was the same as the example 1 for all method and condition.

The electrolyte layer of the example 6 was produced by using the plastic crystal including SBP cations and TFSA anions in a molar ratio of 1:1. Furthermore, the electrolyte layer of the example 6 was produced by using the ionic liquid including EMI cations and TFSA anions in a molar ratio of 1:1 (from Tokyo Chemical Industry Co. Ltd.). The plastic crystal (A) and the ionic liquid (B) were added to a vial in a molar ratio of A:B=66.7:33.3. The process of adding and drying the organic solvent to obtain the electrolyte layer after the plastic crystal and the ionic liquid were added in the vial was the same as the example 1 for all method and condition.

The electrolyte layer of the example 7 was produced by using the plastic crystal including SBP cations and TFSA anions in a molar ratio of 1:1. Furthermore, the electrolyte layer of the example 7 was produced by using the ionic liquid including MEMP cations and TFSA anions in a molar ratio of 1:1 (from Nisshinbo Holdings Inc.). The plastic crystal (A) and the ionic liquid (B) were added to a vial in a molar ratio of A:B=66.7:33.3. The process of adding and drying the organic solvent to obtain the electrolyte layer after the plastic crystal and the ionic liquid were added in the vial was the same as the example 1 for all method and condition.

The electrolyte layer of the example 8 was produced by using the plastic crystal including SBP cations and TFSA anions in a molar ratio of 1:1. Furthermore, the electrolyte layer of the example 8 was produced by using the ionic liquid including DEME cations and TFSA anions in a molar ratio of 1:1 (from Nisshinbo Holdings Inc.). The plastic crystal (A) and the ionic liquid (B) were added to a vial in a molar ratio of A:B=66.7:33.3. The process of adding and drying the organic solvent to obtain the electrolyte layer after the plastic crystal and the ionic liquid were added in the vial was the same as the example 1 for all method and condition.

The electrolyte layer of the example 9 was produced by using the plastic crystal including SBP cations and $BF_4$ anions in a molar ratio of 1:1. Furthermore, the electrolyte layer of the example 9 was produced by using the ionic liquid including MEMP cations and $BF_4$ anions in a molar ratio of 1:1 (from Nisshinbo Holdings Inc.). The plastic crystal (A) and the ionic liquid (B) were added to a vial in a molar ratio of A:B=66.7:33.3. The process of adding and drying the organic solvent to obtain the electrolyte layer after the plastic crystal and the ionic liquid were added in the vial was the same as the example 1 for all method and condition.

The ion conductivity of the electrolyte layers of the examples 4 to 9 were measured. The measurement method and condition of the ion conductivity was the same as the examples 1 to 3. The measurement results for the ion conductivity are shown in Table 2. In the table 2, the ion conductivity of the electrolyte layer in which only the plastic crystal included in each example was used and the ion conductivity of the electrolyte layer in which only the plastic crystal included in each example was used are also described. The comparative electrolyte layer was produced with the same condition as the electrolyte layers of each example except that said electrolyte layer was formed of only the ionic liquid.

ion conductivity of the example 4 was 67 times higher than the ion conductivity of the example 2 in which the anion components of the plastic crystal and the ionic liquid were different. Note that the amount of the ionic liquid in the example 4 is lower than those of the examples 1 and 2.

Furthermore, the ion conductivity of the electrolyte layer of the example 5 was 200 times higher than the ion conductivity of the electrolyte layer formed of only the plastic crystal. The ion conductivity of the example 5 in which the anion components of the plastic crystal and the ionic liquid are the same is 4 times higher than the ion conductivity of the example 3 in which the anion components of the plastic crystal and the ionic liquid are different.

From the result of the examples 4 and 5, it was found that the ion conductivity is further improved when the anion components of the plastic crystal and the ionic liquid are the same type.

Note that, as shown in the table 2, it was found that although the electrolyte layer of the examples 6 to 9 includes the plastic crystal and the ionic liquid having the same anion components, the ion conductivity of the example 6 was 1000 times higher than the ion conductivity of the electrolyte layer formed of only the plastic crystal, the ion conductivity of the example 7 was 300 times higher than the ion conductivity of the electrolyte layer formed of only the plastic crystal, the ion conductivity of the example 8 was 275 times higher than the ion conductivity of the electrolyte layer formed of only the plastic crystal, and the ion conductivity of the example 9 was 1000 times higher than the ion conductivity of the electrolyte layer formed of only the plastic crystal.

TABLE 2

| | Plastic Crystal | | Ionic Liquid | | Ratio of Plastic Crystal (mol %) | Ion Conductivity (S/cm) |
|---|---|---|---|---|---|---|
| | Types | Ion Conductivity (S/cm) | Types | Ion Conductivity (S/cm) | | |
| Example 4 | $SBPBF_4$ | $5.7 \times 10^{-7}$ | $EMIBF_4$ | $1.4 \times 10^{-2}$ | 80 | $4.1 \times 10^{-3}$ |
| Reference (Example 1) | SBPCFSA | $2.3 \times 10^{-7}$ | $EMIBF_4$ | $1.4 \times 10^{-2}$ | 77 | $1.0 \times 10^{-3}$ |
| Reference (Example 2) | SBPNFS | $4.0 \times 10^{-8}$ | $EMIBF_4$ | $1.4 \times 10^{-2}$ | 77 | $6.1 \times 10^{-5}$ |
| Example 5 | $P12BF_3CF_3$ | $2.1 \times 10^{-5}$ | $EMIBF_3CF_3$ | $1.5 \times 10^{-2}$ | 77 | $4.1 \times 10^{-3}$ |
| Reference (Example 3) | $P12BF_3CF_3$ | $2.1 \times 10^{-5}$ | $EMIBF_4$ | $1.4 \times 10^{-2}$ | 77 | $1.1 \times 10^{-3}$ |
| Example 6 | SBPTFSA | $2.0 \times 10^{-6}$ | EMITFSA | $8.4 \times 10^{-3}$ | 66.7 | $2.3 \times 10^{-3}$ |
| Example 7 | SBPTFSA | $2.0 \times 10^{-6}$ | MEMPTFSA | $3.8 \times 10^{-3}$ | 66.7 | $6.2 \times 10^{-4}$ |
| Example 8 | SBPTFSA | $2.0 \times 10^{-6}$ | DEMETFSA | $2.6 \times 10^{-3}$ | 66.7 | $5.5 \times 10^{-4}$ |
| Example 9 | $SBPBF_4$ | $5.7 \times 10^{-7}$ | $MEMPBF_4$ | $2.9 \times 10^{-3}$ | 66.7 | $6.2 \times 10^{-4}$ |

The table 2 describes the examples 1 and 2 for the example 4, and the example 3 for the example 5. The examples 1 and 2 includes the same ionic liquid as the example 3, and the anion component of the plastic crystal and the ionic liquid different from the example 4. The examples 3 includes the same plastic crystal as the example 5, and the anion component of the plastic crystal and the ionic liquid different from the example 5.

As shown in the table 2, the ion conductivity of the electrolyte layer for the electric double layer capacitor of the example 4 was 7200 times higher than the ion conductivity of the electrolyte layer formed of only the plastic crystal. The ion conductivity of the example 4 in which the anion components of the plastic crystal and the ionic liquid were the same was 4.1 times higher than the ion conductivity of the example 1 in which the anion components of the plastic crystal and the ionic liquid were different. Furthermore, the Examples 10 and 11

Various electrolyte layer of the examples 10 with different ratio of the plastic crystal and the ionic liquid was produced, and the ion conductivity and the leakage current was measured. The electrolyte layer of the example 10 was produced by the same method and condition as the electrolyte of the example 4 except that the ratio of the ionic liquid and the plastic crystal was different. Furthermore, various electrolyte layers of the examples 11 with different ratio (molar ratio) of the plastic crystal and the ionic liquid were produced, and the ion conductivity and the leakage current was measured. The electrolyte layer of the example 11 was produced by the same method and condition as the electrolyte of the example 5 except that the ratio of the ionic liquid and the plastic crystal was different.

The separators were impregnated with each electrolyte layer of the examples 10 and 11, sandwiched by two activated-carbon electrodes (with the area of 2.1 cm$^2$) impregnated with the same electrolyte, and was sealed by a laminate to produce cells. Aging was performed to the produced laminate cells at 2.6 V for 12 hours. The cell after the aging was connected to a resistance of 100 Ω), and voltage of 2.3 V was applied to perform constant-voltage charging. During the constant-voltage charging, the voltage applied to the resistance was measured with data logger to calculate the leakage current. In this time, the value of the leakage current after the constant-voltage charging for 50 hours.

The measurement result of the ion conductivity and the leakage current of the electrolyte layer of the examples 10 for each ratio of the plastic crystal and the ionic liquid is shown in the table 3. Also, the results of the table 3 are shown in a graph of FIG. 1. In the graph of FIG. 1, the horizontal axis indicates the molar concentration of the plastic crystal relative to the total of the plastic crystal and the ionic liquid, the vertical axis indicates the ion conductivity, and the value of the leakage current (μA) is described near each plot.

As shown in the table 3 and FIG. 1, it was found that the ion conductivity of the electrolyte layer of the example 10 was higher than the ion conductivity of the electrolyte layer formed of only the plastic crystal until the ratio of the plastic crystal becomes 90 mol % or less relative to the total of the plastic crystal and the ionic liquid. Furthermore, as shown in the table 4 and FIG. 2, it was found that the ion conductivity of the electrolyte layer of the example 11 was higher than the ion conductivity of the electrolyte layer formed of only the plastic crystal until the ratio of the plastic crystal becomes 90 mol % or less relative to the total of the plastic crystal and the ionic liquid.

Furthermore, as shown in the table 3 and FIG. 1, it was found that the ion conductivity of the electrolyte layer of the example 10 formed of the plastic crystal and the ionic having the same anion component expresses about 40% of the ion conductivity of the electrolyte layer formed of only the plastic crystal until the ratio of the plastic crystal becomes 80 mol % or less relative to the total of the plastic crystal and the ionic liquid. Moreover, as shown in the table 4 and FIG. 2, it was found that the ion conductivity of the electrolyte

TABLE 3

Example 10

| Plastic Crystal | | Ionic Liquid | | Ratio of Plastic Crystal (mol %) | Ion Conductivity (S/cm) | Leakage Correct LC (μA) |
|---|---|---|---|---|---|---|
| Types | Ion Conductivity (S/cm) | Types | Ion Conductivity (S/cm) | | | |
| SBPBF$_4$ | $5.7 \times 10^{-7}$ | EMIBF$_4$ | $1.4 \times 10^{-2}$ | 0 | $1.4 \times 10^{-2}$ | 2.59 |
| SBPBF$_4$ | $5.7 \times 10^{-7}$ | EMIBF$_4$ | $1.4 \times 10^{-2}$ | 10 | $1.0 \times 10^{-2}$ | 2.92 |
| SBPBF$_4$ | $5.7 \times 10^{-7}$ | EMIBF$_4$ | $1.4 \times 10^{-2}$ | 40 | $6.0 \times 10^{-3}$ | 2.15 |
| SBPBF$_4$ | $5.7 \times 10^{-7}$ | EMIBF$_4$ | $1.4 \times 10^{-2}$ | 50 | $4.4 \times 10^{-3}$ | 1.95 |
| SBPBF$_4$ | $5.7 \times 10^{-7}$ | EMIBF$_4$ | $1.4 \times 10^{-2}$ | 55 | $4.2 \times 10^{-3}$ | 2.01 |
| SBPBF$_4$ | $5.7 \times 10^{-7}$ | EMIBF$_4$ | $1.4 \times 10^{-2}$ | 60 | $3.9 \times 10^{-3}$ | 1.10 |
| SBPBF$_4$ | $5.7 \times 10^{-7}$ | EMIBF$_4$ | $1.4 \times 10^{-2}$ | 70 | $3.8 \times 10^{-3}$ | 0.93 |
| SBPBF$_4$ | $5.7 \times 10^{-7}$ | EMIBF$_4$ | $1.4 \times 10^{-2}$ | 80 | $4.1 \times 10^{-3}$ | — |
| SBPBF$_4$ | $5.7 \times 10^{-7}$ | EMIBF$_4$ | $1.4 \times 10^{-2}$ | 90 | $4.3 \times 10^{-4}$ | — |
| SBPBF$_4$ | $5.7 \times 10^{-7}$ | EMIBF$_4$ | $1.4 \times 10^{-2}$ | 95 | $9.7 \times 10^{-5}$ | — |

Figure 2:
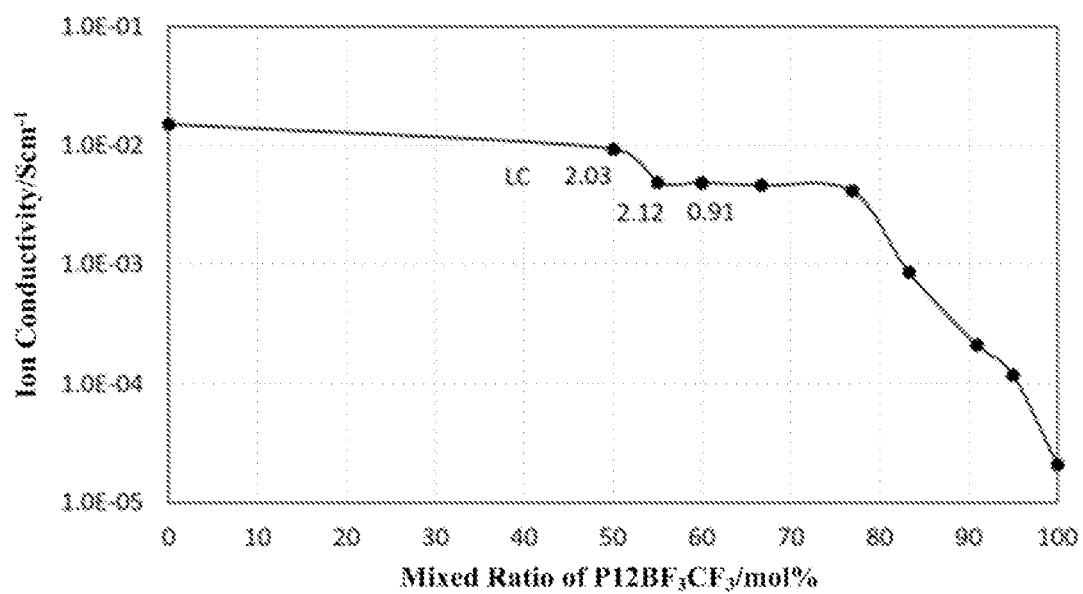
FIG. 2 is a graph showing a measurement result of the ion conductivity and the leakage current of the electrolyte of the example 11.

Next, the measurement result of the ion conductivity and the leakage current of the electrolyte layer of the examples 11 for each ratio of the plastic crystal and the ionic liquid is shown in the table 4. Also, the results of the table 4 are shown in a graph of FIG. 2. In the graph of FIG. 2, the horizontal axis indicates the molar concentration of the plastic crystal relative to the total of the plastic crystal and the ionic liquid, and the vertical axis indicates the value of the leakage current (μA) near each plot.

layer of the example 11 formed of the plastic crystal and the ionic having the same anion component expresses about 30% of the ion conductivity of the electrolyte layer formed of only the plastic crystal until the ratio of the plastic crystal becomes 80 mol % or less relative to the total of the plastic crystal and the ionic liquid.

Here, as shown in the table 3 and FIG. 1, it was found that, when the ratio of the plastic crystal was 60 mol % to 80 mol % relative to the total of the plastic crystal and the ionic

TABLE 4

Exmaple 11

| Plastic Crystal | | Ionic Liquid | | Ratio of Plastic Crystal (mol %) | Ion Conductivity (S/cm) | Leakage Correct LC (μA) |
|---|---|---|---|---|---|---|
| Types | Ion Conductivity (S/cm) | Types | Ion Conductivity (S/cm) | | | |
| P12BF$_3$CF$_3$ | $2.1 \times 10^{-5}$ | EMIBF$_3$CF$_3$ | $1.5 \times 10^{-2}$ | 50 | $9.3 \times 10^{-3}$ | 2.03 |
| P12BF$_3$CF$_3$ | $2.1 \times 10^{-5}$ | EMIBF$_3$CF$_3$ | $1.5 \times 10^{-2}$ | 55 | $4.9 \times 10^{-3}$ | 2.32 |
| P12BF$_3$CF$_3$ | $2.1 \times 10^{-5}$ | EMIBF$_3$CF$_3$ | $1.5 \times 10^{-2}$ | 60 | $4.8 \times 10^{-3}$ | 0.91 |
| P12BF$_3$CF$_3$ | $2.1 \times 10^{-5}$ | EMIBF$_3$CF$_3$ | $1.5 \times 10^{-2}$ | 66.7 | $4.6 \times 10^{-3}$ | — |
| P12BF$_3$CF$_3$ | $2.1 \times 10^{-5}$ | EMIBF$_3$CF$_3$ | $1.5 \times 10^{-2}$ | 77 | $4.1 \times 10^{-3}$ | — |
| P12BF$_3$CF$_3$ | $2.1 \times 10^{-5}$ | EMIBF$_3$CF$_3$ | $1.5 \times 10^{-2}$ | 83.3 | $8.6 \times 10^{-4}$ | — |
| P12BF$_3$CF$_3$ | $2.1 \times 10^{-5}$ | EMIBF$_3$CF$_3$ | $1.5 \times 10^{-2}$ | 90 | $2.3 \times 10^{-4}$ | — |
| P12BF$_3$CF$_3$ | $2.1 \times 10^{-5}$ | EMIBF$_3$CF$_3$ | $1.5 \times 10^{-2}$ | 95 | $1.2 \times 10^{-4}$ | — | liquid, the leakage current of the electrolyte layer of the example 10 formed of the plastic crystal and the ionic having the same anion component was suppressed to about half of the leakage current of the electrolyte layer in which the ratio of the plastic crystal was 55 mol % or less. Furthermore, as shown in the table 4 and FIG. 2, it was found that, when the ratio of the plastic crystal was 60 mol % to 80 mol % relative to the total of the plastic crystal and the ionic liquid, the leakage current of the electrolyte layer of the example 11 formed of the plastic crystal and the ionic having the same anion component was suppressed to about 43% of the leakage current of the electrolyte layer in which the ratio of the plastic crystal was 55 mol % or less.

The electrolyte layers of the examples 10 and 11 were formed of the plastic crystal and the ionic liquid having the same anion component. That is, it was found that when the electrolyte layer was formed of the plastic crystal and the ionic liquid having the same anion component and the ratio of the plastic crystal was 60 mol % to 80 mol % relative to the total of the plastic crystal and the ionic liquid, the suppressed leakage current can be excellently maintained while making the ion conductivity of the electrolyte layer closer to that of the ionic liquid.

Examples 12 to 16

The electrolyte layers for the electric double layer capacitors of the examples 12 to 16 were produced, and the ion conductivity of the electrolyte layers of respective examples were measured.

The electrolyte layer of the example 12 was produced by using the plastic crystal including P12 cations and $BF_3CF_3$ anions in a molar ratio of 1:1. Furthermore, the electrolyte layer of the example 12 was produced by using the ionic liquid including EMI cations and $BF_4$ anions in a molar ratio of 1:1. The plastic crystal (A) and the ionic liquid (B) were added to a vial in a molar ratio of A:B=2:1. That is, the electrolyte layer of the example 12 included the ionic liquid and the plastic crystal, and the anion components of the ionic liquid and the plastic crystal were different.

Polyethylene oxide (PEO) with the molecular weight of 2500000 was further added to the vial as a polymer. PEO was added so that the concentration thereof becomes 5 wt % relative to the total amount of the plastic crystal forming the electrolyte layer. The process of adding and drying the organic solvent to obtain the electrolyte layer after the plastic crystal and the ionic liquid were added in the vial was the same as the example 1 for all method and condition.

The electrolyte layer of the example 13 was produced by using the plastic crystal including SBP cations and $BF_4$ anions in a molar ratio of 1:1. Furthermore, the electrolyte layer of the example 13 was produced by using the ionic liquid including EMI cations and $BF_4$ anions in a molar ratio of 1:1. The plastic crystal (A) and the ionic liquid (B) were added to a vial in a molar ratio of A:B=2:1. That is, the electrolyte layer of the example 13 included the ionic liquid and the plastic crystal, the anion components of the ionic liquid and the plastic crystal were the same, and only one type of the plastic crystal was included in the electrolyte layer.

The electrolyte layer of the example 14 was produced by using two types of the plastic crystals. The first plastic crystal included SBP cations and $BF_4$ anions in a molar ratio of 1:1. The second plastic crystal included P12 cations and $BF_4$ anions in a molar ratio of 1:1. Both plastic crystals were added to a vial in the equimolar amount. Furthermore, the electrolyte layer of the example 14 was produced by using the ionic liquid including EMI cations and $BF_4$ anions in a molar ratio of 1:1. Both plastic crystals (A) and the ionic liquid (B) were added to a vial in a molar ratio of A:B=77:23. That is, the electrolyte layer of the example 14 included the ionic liquid and the plastic crystal, two types of the plastic crystal were included in the electrolyte layer, the anion component of the first plastic crystal was the same as that of the ionic liquid, and the anion components of both plastic crystal were the same as that of the ionic liquid. However, the cation components of the two plastic crystals were different.

The electrolyte layer of the example 15 was produced by using two types of the plastic crystals. The first plastic crystal included P12 cations and $BF_4$ anions in a molar ratio of 1:1. The second plastic crystal included P12 cations and $BF_3CF_3$ anions in a molar ratio of 1:1. Both plastic crystals were added to a vial in the equimolar amount. Furthermore, the electrolyte layer of the example 15 was produced by using the ionic liquid including EMI cations and $BF_4$ anions in a molar ratio of 1:1. Both plastic crystals (A) and the ionic liquid (B) were added to a vial in a molar ratio of A:B=2:1. That is, the electrolyte layer of the example 15 included the ionic liquid and the plastic crystal, two types of the plastic crystal were included in the electrolyte layer, the anion component of the first plastic crystal was the same as that of the ionic liquid, the anion component of the second plastic crystal was different from that of the ionic liquid, and the cation components of both plastic crystal were the same.

The electrolyte layer of the example 16 was produced by using two types of the plastic crystals. The first plastic crystal included SBP cations and $BF_4$ anions in a molar ratio of 1:1. The second plastic crystal included P12 cations and $BF_3CF_3$ anions in a molar ratio of 1:1. Both plastic crystals were added to a vial in the equimolar amount. Furthermore, the electrolyte layer of the example 16 was produced by using the ionic liquid including EMI cations and $BF_4$ anions in a molar ratio of 1:1. Both plastic crystals (A) and the ionic liquid (B) were added to a vial in a molar ratio of A:B=2:1. That is, the electrolyte layer of the example 16 included the ionic liquid and the plastic crystal, two types of the plastic crystal were included in the electrolyte layer, the anion component of the first plastic crystal was the same as that of the ionic liquid, the anion component of the second plastic crystal was different from that of the ionic liquid, and the cation components of both plastic crystal were different.

Note that, the examples 13 to 16 were the same as the example 12 in that polyethylene oxide (PEO) with the molecular weight of 2500000 was further added as a polymer, and that PEO was added so that the concentration thereof became 5 wt % relative to the total amount of the plastic crystal forming the electrolyte layer. The process of adding and drying the organic solvent to obtain the electrolyte layer after the plastic crystal and the ionic liquid were added in the vial was the same as the examples 1 for all method and condition.

The ion conductivity of the electrolyte layers of the examples 12 to 16 were measured, and the result is shown in the table 5.

TABLE 5

| | Plastic Crystal 1 (A) | | Plastic Crystal 2 (B) | | Ionic Liquid | | Ratio mol % (A/B/C) | PEO | Ion Conductivity (S/cm) |
|---|---|---|---|---|---|---|---|---|---|
| | Types | Ion Conductivity (S/cm) | Types | Ion Conductivity (S/cm) | Types | Ion Conductivity (S/cm) | | | |
| Example 12 | P12BF$_3$CF$_3$ | $2.1 \times 10^{-5}$ | — | — | EMIBF$_4$ | $1.4 \times 10^{-2}$ | 66.6/0/33.3 | 5 wt % | $2.5 \times 10^{-3}$ |
| Example 13 | SBPBF$_4$ | $5.7 \times 10^{-7}$ | — | — | EMIBF$_4$ | $1.4 \times 10^{-2}$ | 66.6/0/33.3 | 5 wt % | $3.6 \times 10^{-3}$ |
| Example 14 | SBPBF$_4$ | $5.7 \times 10^{-7}$ | P12BF$_4$ | $5.4 \times 10^{-6}$ | EMIBF$_4$ | $1.4 \times 10^{-2}$ | 38.5/38.5/23 | 5 wt % | $5.0 \times 10^{-3}$ |
| Example 15 | P12BF$_4$ | $5.4 \times 10^{-6}$ | P12BF$_3$CF$_3$ | $2.1 \times 10^{-5}$ | EMIBF$_4$ | $1.4 \times 10^{-2}$ | 33.3/33.3/33.3 | 5 wt % | $6.9 \times 10^{-3}$ |
| Example 16 | SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 33.3/33.3/33.3 | 5 wt % | $8.6 \times 10^{-3}$ |

As shown in the table 5, it was found that the ion conductivity of the electrolyte layer of the example 13 is higher than the ion conductivity of the electrolyte layer of the example 12, the ion conductivity of the electrolyte layer of the example 14 is higher than the ion conductivity of the electrolyte layer of the example 13, the ion conductivity of the electrolyte layer of the example 15 is higher than the ion conductivity of the electrolyte layer of the example 14, and the ion conductivity of the electrolyte layer of the example 16 is higher than the ion conductivity of the electrolyte layer of the example 15.

That is, the ion conductivity of the electrolyte layer including the plastic crystal and the ionic liquid was improved compared with the ion conductivity of the electrolyte layer formed of only the plastic crystal. the ion conductivity of the electrolyte layer is further improved when the anion components of the plastic crystal and the ionic liquid are the same type. The ion conductivity of the electrolyte layer is further improved when two types of the plastic crystal having the anion components as same as the ionic liquid is included in the electrolyte layer. The ion conductivity of the electrolyte layer is further improved when the plastic crystal having the anion components different from the ionic liquid is further included. Finally, the ion conductivity of the electrolyte layer is further improved when the plastic crystal having the anion components as same as the ionic liquid and the plastic crystal having the anion component different from the ionic liquid are included in the electrolyte layer. The above was found.

Example 17

Various electrolyte layers of the examples 17 with different ratio of two plastic crystal were produced, and the ion conductivity was measured. The electrolyte layer of the example 17 was produced by the same method and condition as the electrolyte of the example 16 except that the ratio of the two plastic crystal was different. The measurement results for the ion conductivity are shown in Table 6. Also, the results of the table 6 are shown in a graph of FIG. 3. In the graph in FIG. 3, the horizontal axis indicates the molar concentration of the two plastic crystals formed of SBP cation and BF$_4$ cation, and the vertical axis indicates the ion conductivity.

TABLE 6

Example 17

| Plastic Crystal 1 (A) | | Plastic Crystal 2 (B) | | Ionic Liquid (C) | | Ratio mol % (A/B/C) | Molar Ratio (A/B) | PEO | Ion Conductivity (S/cm) |
|---|---|---|---|---|---|---|---|---|---|
| Types | Ion Conductivity (S/cm) | Types | Ion Conductivity (S/cm) | Types | Ion Conductivity (S/cm) | | | | |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 66.6/0/33.3 | 100/0 | 5 wt % | $2.5 \times 10^{-3}$ |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 46.6/20.0/33.3 | 70/30 | 5 wt % | $4.9 \times 10^{-3}$ |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 40.0/26.6/33.3 | 60/40 | 5 wt % | $6.0 \times 10^{-3}$ |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 33.3/33.3/33.3 | 50/50 | 5 wt % | $8.6 \times 10^{-3}$ |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 26.6/40.0/33.3 | 40/60 | 5 wt % | $6.3 \times 10^{-3}$ |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 20.0/46.6/33.3 | 30/70 | 5 wt % | $5.7 \times 10^{-3}$ |
| SBPBF$_4$ | $5.7 \times 10^{-7}$ | P12BF$_3$CF$_3$ | $2.1 \times 10^{-5}$ | EMIBF$_4$ | $1.4 \times 10^{-2}$ | 0/66.6/33.3 | 0/100 | 5 wt % | $3.6 \times 10^{-3}$ |

Figure 3:
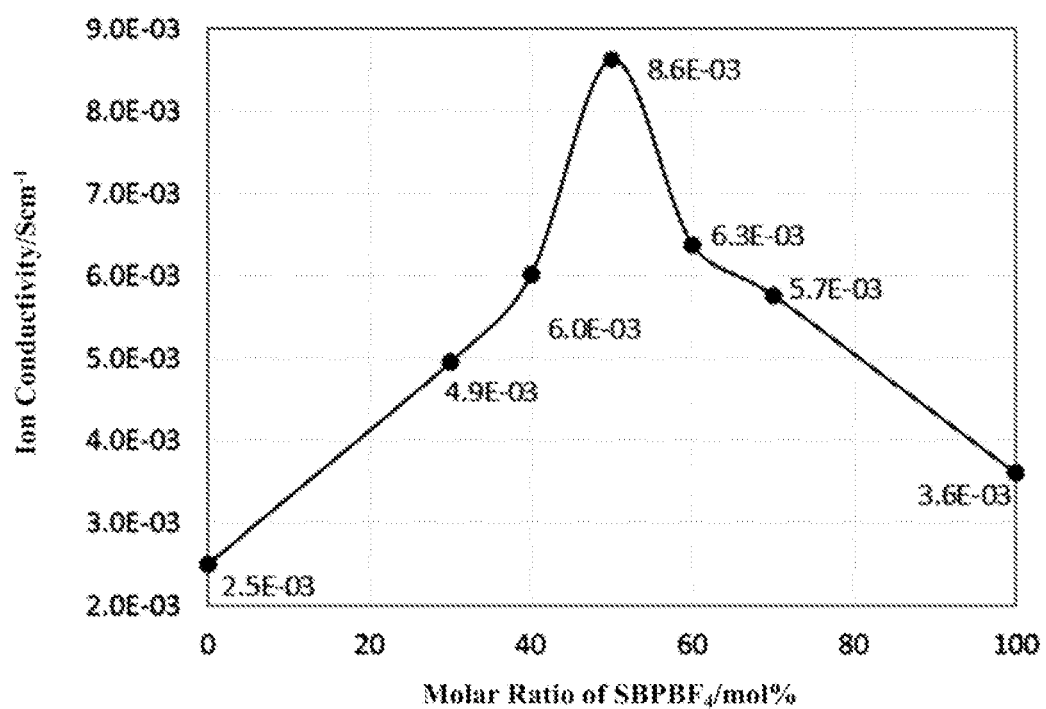
FIG. 3 is a graph showing a measurement result of the ion conductivity for each ratio of the plastic crystal of the electrolyte of the example 17.

As shown in the table 6 and FIG. 3, it was found that the ion conductivity of the electrolyte layer of the example 17 was improved as the molecular amount of the two plastic crystals became closer to equivalent. Furthermore, it was found that when the molar ratio of the two plastic crystals was in the range of 40:60 to 60:40, and the ion conductivity was increased and the two plastic crystals were in the equimolar amount, the ion conductivity was greatly improved.

Example 18

The electrolyte layer of the example 18 was a modified example of the example 17, and the second plastic crystal was P12TFSA plastic crystal including P12 cations and TFSA anions in a molar ratio of 1:1. Other method and condition were the same as the electrolyte of the example 17. Note that the molar ratio of the two plastic crystal was in the range of 40:60 to 60:40. The measurement results for the ion conductivity of the example 18 are shown in Table 7.

TABLE 7

Example 18

| | Plastic Crystal 1 (A) | | Plastic Crystal 2 (B) | | Ionic Liquid (C) | | | | |
| --- | --- | --- | --- | --- | --- | --- | --- | --- | --- |
| Types | Ion Conductivity (S/cm) | Types | Ion Conductivity (S/cm) | Types | Ion Conductivity (S/cm) | Ratio mol % (A/B/C) | Molar Ratio (A/B) | PEO | Ion Conductivity (S/cm) |
| SBPBF$_4$ | $5.7 \times 10^{-7}$ | P12BFSA | $3.0 \times 10^{-8}$ | EMIBF$_4$ | $1.4 \times 10^{-2}$ | 30.8/46.2/23.0 | 40.0/60.0 | 5 wt % | $3.1 \times 10^{-3}$ |
| SBPBF$_4$ | $5.7 \times 10^{-7}$ | P12BFSA | $3.0 \times 10^{-8}$ | EMIBF$_4$ | $1.4 \times 10^{-2}$ | 38.5/38.5/23.0 | 50.0/50.0 | 5 wt % | $4.5 \times 10^{-3}$ |
| SBPBF$_4$ | $5.7 \times 10^{-7}$ | P12BFSA | $3.0 \times 10^{-8}$ | EMIBF$_4$ | $1.4 \times 10^{-2}$ | 46.2/30.8/23.0 | 60.0/40.0 | 5 wt % | $3.9 \times 10^{-3}$ |

As illustrated in the table 7, when the molar ratio of the two plastic crystals was in the range of 40:60 to 60:40, and the ion conductivity was increased and the two plastic crystals were in the equimolar amount, the ion conductivity of the electrolyte layer of the example 18 was greatly improved. That is, from the examples 17 and 18, it was found that when the molar ratio of the first plastic crystal having the anion component as same as the ionic liquid and the second plastic crystal having the anion component different from th ionic liquid was in the range of 40:60 to 60:40, and the ion conductivity was increased regardless of the types of the plastic crystal, and when the two plastic crystals were in the equimolar amount, the ion conductivity was greatly improved.

Examples 19 and 20

The electrolyte layers for the electric double layer capacitors of the examples 19 and 20 were produced. The electrolyte layer of the examples 19 and 20 was produced by using two types of the plastic crystals. The first plastic crystal included SBP cations and BF$_4$ anions in a molar ratio of 1:1. The second plastic crystal included P12 cations and BF$_4$ anions in a molar ratio of 1:1. The two plastic crystals were included in the electrolyte layer in equimolar amount. Furthermore, the electrolyte layers of the examples 19 and 20 were produced by using the ionic liquid including DEME cations and BF$_4$ anions in a molar ratio of 1:1. Note that the amount of the ionic liquid in the examples 19 and 20 was different. The polymer was not added in the electrolyte layer of the examples 19 and 20.

The ion conductivity of the electrolyte layers of the examples 19 and 20 was measured, and the result is shown in the table 8.

TABLE 8

| | Plastic Crystal 1 (A) | | Plastic Crystal 2 (B) | | Ionic Liquid (C) | | | | |
| --- | --- | --- | --- | --- | --- | --- | --- | --- | --- |
| | Types | Ion Conductivity (S/cm) | Types | Ion Conductivity (S/cm) | Types | Ion Conductivity (S/cm) | Ratio mol % (A/B/C) | Molar Ratio (A/B) | Ion Conductivity (S/cm) |
| Example 19 | SBPBF$_4$ | $5.7 \times 10^{-7}$ | P12BF$_4$ | $5.4 \times 10^{-5}$ | DEMEBF$_4$ | $3.2 \times 10^{-3}$ | 38.5/38.5/23.0 | 50.0/50.0 | $5.7 \times 10^{-4}$ |
| Example 20 | SBPBF$_4$ | $5.7 \times 10^{-7}$ | P12BF$_4$ | $5.4 \times 10^{-5}$ | DEMEBF$_4$ | $1.2 \times 10^{-3}$ | 33.3/33.3/33.3 | 50.0/50.0 | $2.5 \times 10^{-3}$ |

As shown in the table 8, the ion conductivity of the electrolyte layer of the example 19 was 100 to 1000 times higher than the ion conductivity of the electrolyte layer formed of only the plastic crystal. Furthermore, the ion conductivity of the electrolyte layer of the example 20 was 460 to 4400 times higher than the ion conductivity of the electrolyte layer formed of only the plastic crystal. Note that the total of the plastic crystal was 66.6 to 77 mol % in the examples 19 and 20.

Examples 21 to 25

The ion conductivity of the electrolyte layers of the examples 21 to 25 were measured.

TABLE 9

| | Plastic Crystal 1 (A) | | Plastic Crystal 2 (B) | | Ionic Liquid (C) | | | | | |
| --- | --- | --- | --- | --- | --- | --- | --- | --- | --- | --- |
| | Types | Ion Conductivity (S/cm) | Types | Ion Conductivity (S/cm) | Types | Ion Conductivity (S/cm) | Ratio mol % (A/B/C) | Molar Ratio (A/B) | PEO | Ion Conductivity (S/cm) |
| Example 21 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 45.5/45.5/9.0 | 50.0/50.0 | 5 wt % | $2.3 \times 10^{-3}$ |
| Example 22 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 41.7/41.7/16.6 | 50.0/50.0 | 5 wt % | $3.5 \times 10^{-3}$ |
| Example 23 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 38.5/38.5/23.0 | 50.0/50.0 | 5 wt % | $3.9 \times 10^{-3}$ |
| Example 24 | SBPBF$_4$ | $5.7 \times 10^{-7}$ | P12BFSA | $1.0 \times 10^{-8}$ | DEMEBF$_4$ | $1.2 \times 10^{-3}$ | 38.5/38.5/23.0 | 50.0/50.0 | 10 wt % | $3.9 \times 10^{-3}$ |
| Example 25 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 10 wt % | $5.0 \times 10^{-3}$ |

As shown in the table 9, the electrolyte layers of the examples 21 to 23 and 25 included the first plastic crystal formed of SBP cations and BF$_4$ anions in 1:1. Furthermore, the electrolyte layers of the examples 21 to 23 and 25 included the second plastic crystal formed of P12 cations and BF$_3$CF$_3$ anions in 1:1. Moreover, the electrolyte layers of the examples 21 to 23 and 25 included the ionic liquid formed of DEME cations and BF$_4$ anions in 1:1. The electrolyte layers of the examples 21 to 23 and 25 were the same in including two plastic crystal in equimolar amount, but were different in the ratio of the plastic crystal and the ionic liquid.

Furthermore, the electrolyte layers of the example 24 included the first plastic crystal formed of SBP cations and $BF_3$ anions in 1:1. Furthermore, the electrolyte layers of the example 24 included the second plastic crystal formed of P12 cations and TFSA anions in 1:1. Moreover, the electrolyte layers of the example 24 included the ionic liquid formed of DEME cations and $BF_4$ anions in 1:1.

The polyethylene oxide (PEO) with the molecular weight of 2500000 was added to the electrolyte layers of the examples 21 to 25 so that the concentration thereof became 5 wt % or 10 wt % relative to the total amount of the plastic crystal.

As shown in the table 9, the ion conductivity of the electrolyte layers of the examples 21 to 23 and 25 were 100 to 8800 times higher than the ion conductivity of the electrolyte layer formed of only the plastic crystal. Furthermore, the ion conductivity of the electrolyte layer of the example 24 was 6800 to 390000 times higher than the ion conductivity of the electrolyte layer formed of only the plastic crystal. Note that the total of the plastic crystal was 66.6 to 91 mol % in the examples 21 and 25. In the example 21, the ion conductivity was at least 100 times higher even though the ratio of the ionic liquid was only 9 mol % of the total.

Comparative Example 1 and Example 26

The electrolyte layers for the electric double layer capacitors of the comparative example 1 and example 26 were produced. The electrolyte layers of the examples 1 and 26 were commonly produced by using the ionic liquid including EMI cations and TFSA anions in a molar ratio of 1:1. However, the electrolyte layer of the example 26 included the plastic crystal formed of the SBP cations and TFSA anions in a molar ratio of 1:1, while the electrolyte layer of the comparative example 1 included lithium bis(trifluoromethanesulfonyl)amide (LiTFSA) and did not include the plastic crystal. Although lithium bis(trifluoromethanesulfonyl)amide (LiTFSA) had a composition similar to the plastic crystal, the material state was solid, not the plastic crystal.

The ion conductivity and the resistance value of the electrolyte layers of the comparative example 1 and the example 26 were measured, and the result is shown in the table 10. The separators were impregnated with each electrolyte layer, sandwiched by two activated-carbon electrodes (with the area of 2.1 cm$^2$) impregnated with the same electrolyte, and was sealed by a laminate to produce cells. These cells were charged to 2.5 V at the constant current of 0.1 mA, was released for 1 second after the voltage reached 2.5 V, and the voltage drop during this release period was measured. The resistance value was measured by dividing this voltage drop by the charging current value of 0.1 mA.

As shown in the table 10, the ion conductivity of the comparative example 1 was only about 4/1000 of the ion conductivity of the example 26. Accordingly, it was found that the ion conductivity would not improve even when the electrolyte layer was produced by mixing the ionic liquid and the compound that is not the plastic crystal such as LiTFSA, and that the ion conductivity was improved by mixing the ionic liquid and the plastic crystal. Furthermore, it was found that, since the ion conductivity was improved, the resistance value of the electrolyte layer of the example 26 was reduced to about 7/1000 of that of the comparative example 1.

Examples 27 to 36

The electrolyte layers for the electric double layer capacitors of the examples 27 to 36 were produced, and the ion conductivity of each electrolyte layer was measured.

The common points of the electrolytic layers of the examples 27 to 36 were as follows. That is, the electrolyte layers of the examples 27 to 36 was produced by using the ionic liquid including DEME cations and $BF_4$ anions in a molar ratio of 1:1. The plastic crystal (A) and the ionic liquid (B) were added to a vial in a molar ratio of A:B=66.7:33.3.

The electrolyte layers of the example 27 to 29 were produced by using one type of the plastic crystal. The plastic crystal used in the electrolyte layer of the example 27 included SBP cations and $BF_4$ anions in a molar ratio of 1:1. The plastic crystal used in the electrolyte layer of the example 28 included the plastic crystal including P12 cations and $BF_3CF_3$ anions in a molar ratio of 1:1. The plastic crystal used in the electrolyte layer of the example 29 included the plastic crystal including SBP cations and $BF_4$ anions in a molar ratio of 1:1.

In contrast, the electrolyte layers of the example 30 to 36 were produced by using two types of the plastic crystal in a molar ratio of 1:1. The electrolyte layers of the example 30 to 33 included the plastic crystal including SBP cations and $BF_4$ anions in a molar ratio of 1:1 and the plastic crystal including P12 cations and $BF_3CF_3$ anions in a molar ratio of 1:1. The electrolyte layer of the example 34 included the plastic crystal including SBP cations and $BF_4$ anions in a molar ratio of 1:1 and the plastic crystal including P12 cations and $BF_4$ anions in a molar ratio of 1:1. The electrolyte layer of the example 35 included the plastic crystal including P12 cations and $BF_3CF_3$ anions in a molar ratio of 1:1 and the plastic crystal including P12 cations and $BF_4$ anions in a molar ratio of 1:1.

Polyethylene carbonate (PEC) was commonly added to the electrolyte layers of the examples 27 to 36 as the polymer. Regarding the electrolyte layers of the examples 27 to 29, 35, and 36, polyethylene carbonate was added to the vial so that the concentration thereof would be 50 wt % relative to the total amount of the plastic crystal.

TABLE 10

| | | Plastic Crystal (B) | | Ionic Liquid (C) | | | | | |
|---|---|---|---|---|---|---|---|---|---|
| | Electrolyte (A) | Types | Ion Conductivity (S/cm) | Types | Ion Conductivity (S/cm) | Ratio mol % (A/B/C) | PEO | Ion Conductivity (S/cm) | Resistance (Ω) |
| Comparative Example 1 | LiTFSA | — | — | EMITFSA | 8.4 × 10$^{-3}$ | 70.0/0/30.0 | 0 wt % | 9.0 × 10$^{-6}$ | 6007 |
| Example 26 | — | SBPTFSA | 2.0 × 10$^{-6}$ | EMITFSA | 8.4 × 10$^{-3}$ | 0/70.0/30.0 | 0 wt % | 2.3 × 10$^{-3}$ | 45 |

Regarding the electrolyte layers of the examples 30 to 34, the composition of the plastic crystal and the ionic liquid were the same, however, the addition amount of the polyethylene carbonate was different. That is, polyethylene carbonate was added to the example 30 so that the concentration thereof would be 10 wt % relative to the total plastic crystal, polyethylene carbonate was added to the example 31 so that the concentration thereof would be 20 wt % relative to the total plastic crystal, polyethylene carbonate was added to the example 32 so that the concentration thereof would be 50 wt % relative to the total plastic crystal, polyethylene carbonate was added to the example 33 so that the concentration thereof would be 100 wt % relative to the total plastic crystal, and polyethylene carbonate was added to the example 34 so that the concentration thereof would be 150 wt % relative to the total amount of the plastic crystal.

The ion conductivity of the electrolyte layers of the examples 27 to 36 were measured, and the result is shown in the table 11.

TABLE 11

| | Plastic Crystal 1 (A) | | Plastic Crystal 2 (B) | | Ionic Liquid (C) | | | | | |
|---|---|---|---|---|---|---|---|---|---|---|
| | Types | Ion Conductivity (S/cm) | Types | Ion Conductivity (S/cm) | Types | Ion Conductivity (S/cm) | Ratio mol % (A/B/C) | Molar Ratio (A/B) | PEO | Ion Conductivity (S/cm) |
| Example 27 | SBPBF$_4$ | $5.7 \times 10^{-7}$ | — | — | DEMEBF$_4$ | $1.2 \times 10^{-3}$ | 66.7/0/33.3 | 100/0 | 50 wt % | $4.6 \times 10^{-3}$ |
| Example 28 | P12BF$_3$CF$_3$ | $2.1 \times 10^{-5}$ | — | — | DEMEBF$_4$ | $1.2 \times 10^{-3}$ | 66.7/0/33.3 | 100/0 | 50 wt % | $5.0 \times 10^{-3}$ |
| Example 29 | P12BF$_4$ | $5.4 \times 10^{-6}$ | — | — | DEMEBF$_4$ | $1.2 \times 10^{-3}$ | 66.7/0/33.3 | 100/0 | 50 wt % | $5.2 \times 10^{-3}$ |
| Example 30 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 10 wt % | $5.5 \times 10^{-3}$ |
| Example 31 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 20 wt % | $5.7 \times 10^{-3}$ |
| Example 32 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 50 wt % | $6.0 \times 10^{-3}$ |
| Example 33 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 100 wt % | $4.5 \times 10^{-3}$ |
| Example 34 | SBPBF$_4$ | $5.7 \times 10^{-7}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 150 wt % | $3.6 \times 10^{-3}$ |
| Example 35 | SBPBF$_4$ | $5.7 \times 10^{-7}$ | P12BF$_4$ | $5.4 \times 10^{-6}$ | DEMEBF$_4$ | $1.2 \times 10^{-3}$ | 33.3/33.3/33.3 | 50.0/50.0 | 50 wt % | $5.2 \times 10^{-3}$ |
| Example 36 | P12BF$_4$ | $5.4 \times 10^{-6}$ | P12BF$_3$CF$_3$ | $2.1 \times 10^{-5}$ | DEMEBF$_4$ | $1.2 \times 10^{-3}$ | 33.3/33.3/33.3 | 50.0/50.0 | 50 wt % | $6.1 \times 10^{-3}$ |

As shown in the table 11, when comparing the electrolyte layers of the example 30 to 34, the ion conductivity of the electrolyte layers of the examples 31 to 33 were higher. Polyethylene carbonate (PEC) was added to the electrolyte layers of the examples 31 to 33 so that the concentration thereof became 20 wt % or 100 wt % relative to the total amount of the plastic crystal. As a result, the ion conductivity of the electrolyte layer of the examples 32 was the highest. Polyethylene carbonate (PEC) was added to the electrolyte layer of the example of 32 so that the concentration thereof became 50 wt % relative to the total amount of the plastic crystal. Furthermore, polyethylene carbonate (PEC) was added to the electrolyte layers of the examples 27 to 29, 35, and 36 so that the concentration thereof became 50 wt % relative to the total amount of the plastic crystal, and the ion conductivity of the electrolyte layers of the examples 27 to 29, 35 and 36 were high.

Accordingly, it was found that if the carbonate polymers are included in the electrolyte layer, the ion conductivity is further improved when the carbonate polymers are in the range of 20 wt % to 100 wt %, and the ion conductivity of the electrolyte layer is significantly improved when the carbonate polymer is about 50 wt % relative to the total amount of the plastic crystal.

The invention claimed is:

1. An electric double layer capacitor comprising:
   a pair of electrode bodies having polarizable electrodes; and
   an electrolyte layer including ionic liquid and plastic crystals,
   wherein the plastic crystal is included in the electrolyte layer at a ratio of 60 mol % to 90 mol % relative to the total of the ionic liquid and the plastic crystal.

2. The electric double layer capacitor according to claim 1, wherein the plastic crystal and the ionic liquid have the same type of anion components.

3. The electric double layer capacitor according to claim 2, wherein the electrolyte layer includes two types of plastic crystals having cation components different from each other as the plastic crystal having the anion components as same as that of the ionic liquid.

4. The electric double layer capacitor according to claim 2, wherein the plastic crystal is included in the electrolyte layer at a ratio of 60 mol % to 80 mol % relative to the total of the ionic liquid and the plastic crystal.

5. The electric double layer capacitor according to claim 2, wherein the electrolyte layer includes other types of plastic crystals.

6. The electric double layer capacitor according to claim 2, wherein the plastic crystal included in the electrolyte layer is pyrrolidinium cations, ammonium cations, piperidinium cations, and phosphonium cations.

7. The electric double layer capacitor according to claim 2, wherein the cation of the plastic crystal included in the electrolyte layer does not include lithium ions.

8. The electric double layer capacitor according to claim 1, wherein the plastic crystal is included in the electrolyte layer at a ratio of 60 mol % to 80 mol % relative to the total of the ionic liquid and the plastic crystal.

9. The electric double layer capacitor according to claim 1, wherein the electrolyte layer includes other types of plastic crystals.

10. The electric double layer capacitor according to claim 9, wherein the electrolyte layer further includes other types of plastic crystals having anion components different from that of the ionic liquid, in addition to the plastic crystal having anion components as same as that of the ionic liquid.

11. The electric double layer capacitor according to claim 10, wherein the other types of the plastic crystal have cation components other that of the plastic crystal having the anion components as same as that of the ionic liquid.

12. The electric double layer capacitor according to claim 11, wherein the molar ratio of the plastic crystal having the anion component as same as that of the ionic liquid and the other types of the plastic crystal having the anion component different from that of the ionic liquid is in a range of 40:60 to 60:40.

13. The electric double layer capacitor according to claim 10, wherein the molar ratio of the plastic crystal having the anion component as same as that of the ionic liquid and the other types of the plastic crystal having the anion component different from that of the ionic liquid is in a range of 40:60 to 60:40.

14. The electric double layer capacitor according to claim 9, wherein the cation of the plastic crystal included in the electrolyte layer does not include lithium ions.

15. The electric double layer capacitor according to claim 1, wherein the plastic crystal included in the electrolyte layer is pyrrolidinium cations, ammonium cations, piperidinium cations, and phosphonium cations.

16. The electric double layer capacitor according to claim 1, wherein the cation of the plastic crystal included in the electrolyte layer does not include lithium ions.

17. The electric double layer capacitor according to claim 1, wherein the electrolyte layer further includes carbonate polymers.

18. The electric double layer capacitor according to claim 1, wherein the electrolyte layer includes two types of plastic crystals having cation components different from each other as the plastic crystal having the anion components as same as that of the ionic liquid.

* * * * *